US009672668B2

(12) United States Patent
Yu

(10) Patent No.: US 9,672,668 B2
(45) Date of Patent: Jun. 6, 2017

(54) KEYED MEMORY DEVICE TO RECORD INPUT USER SIGNALS AND OUTPUT RECORDED USER SIGNALS

(71) Applicant: Mattel, Inc., El Segundo, CA (US)

(72) Inventor: Jessica S. Yu, Culver City, CA (US)

(73) Assignee: Mattel, Inc., El Segundo, CA (US)

( * ) Notice: Subject to any disclaimer, the term of this patent is extended or adjusted under 35 U.S.C. 154(b) by 238 days.

(21) Appl. No.: 14/037,894

(22) Filed: Sep. 26, 2013

(65) Prior Publication Data

US 2014/0091907 A1 Apr. 3, 2014

Related U.S. Application Data

(60) Provisional application No. 61/707,065, filed on Sep. 28, 2012.

(51) Int. Cl.

| | |
|---|---|
| ***G07C 9/00*** | (2006.01) |
| ***E05B 49/00*** | (2006.01) |
| ***G08B 13/14*** | (2006.01) |
| ***B60R 25/00*** | (2013.01) |
| ***G05B 19/00*** | (2006.01) |

(52) U.S. Cl.

CPC ..... *G07C 9/00007* (2013.01); *G07C 9/00912* (2013.01)

(58) Field of Classification Search

CPC ........ G07C 9/00007; G07C 9/00; E05B 49/00
USPC ............ 340/5.65, 5.73, 568.1; 700/213, 214, 700/228; 235/382.5
See application file for complete search history.

(56) References Cited

U.S. PATENT DOCUMENTS

| | | | | |
|---|---|---|---|---|
| 1,631,965 A * | 6/1927 | Kaufman | A45D 27/22 | 206/0.81 |
| 3,654,706 A | 4/1972 | Perrella | | |
| 3,670,427 A * | 6/1972 | Stolpen | G09B 19/06 | 273/146 |
| 3,843,132 A | 10/1974 | Ferguson | | |
| 3,867,785 A | 2/1975 | Ryan et al. | | |
| 4,209,782 A * | 6/1980 | Donath | G07C 9/00119 | 235/382.5 |
| 4,333,258 A | 6/1982 | McCaslin | | |
| 4,343,609 A | 8/1982 | Cardinal | | |
| 4,348,191 A | 9/1982 | Lipsitz et al. | | |
| 4,385,762 A | 5/1983 | Schwartz | | |

(Continued)

FOREIGN PATENT DOCUMENTS

| | | |
|---|---|---|
| DE | 3813779 A1 | 11/1989 |
| DE | 19929931 A1 | 1/2000 |

(Continued)

*Primary Examiner* — Nam V Nguyen
(74) *Attorney, Agent, or Firm* — Edell, Shapiro & Finnan, LLC

(57) ABSTRACT

An electronic system is configured to receive input content (e.g., audio content, video content and/or other content) from a user and convert the input content to input signals (e.g., audio signals, video signals, etc.) that are stored in an electronic storage medium, where the input signals correspond with specific code signals. The recorded input signals are output based upon specific code signals input to the electronic device. For example, the electronic system can include an electronic device and at least one accessory associated with the electronic device, where the accessory includes an accessory code that is readable by a code reader of the electronic device.

19 Claims, 9 Drawing Sheets

(56) References Cited

U.S. PATENT DOCUMENTS 4,524,967 A 6/1985 Hanson et al.
4,526,550 A 7/1985 Lurito
4,609,356 A 9/1986 Gilden et al.
4,729,564 A 3/1988 Kuna et al.
4,778,391 A 10/1988 Weiner
4,820,233 A 4/1989 Weiner
4,824,375 A 4/1989 Weiner
4,969,650 A 11/1990 Magara et al.
4,982,587 A * 1/1991 Tzou .................... E05B 49/004 70/277
4,993,983 A 2/1991 Kurita et al.
5,013,047 A 5/1991 Schwab
5,082,286 A 1/1992 Ryan et al.
5,087,043 A 2/1992 Billings et al.
5,120,065 A 6/1992 Driscoll et al.
5,127,869 A 7/1992 Hanzawa
5,129,654 A 7/1992 Bogner
5,184,971 A 2/1993 Williams
5,188,368 A 2/1993 Ryan
5,190,285 A 3/1993 Levy et al.
5,314,336 A 5/1994 Diamond et al.
5,330,380 A 7/1994 McDarren et al.
5,334,022 A 8/1994 Kitagawa et al.
5,346,399 A 9/1994 Sakow
5,359,374 A * 10/1994 Schwartz ............ A47G 1/0616 40/455
5,372,511 A 12/1994 Cheung
5,390,109 A 2/1995 Takemoto et al.
5,433,610 A 7/1995 Godfrey et al.
5,583,435 A 12/1996 Takemoto et al.
5,607,336 A 3/1997 Lebensfeld et al.
5,609,508 A 3/1997 Wingate
5,631,883 A 5/1997 Li
5,651,681 A 7/1997 Chan
5,679,049 A 10/1997 Arad et al.
5,749,253 A * 5/1998 Glick ...................... E05B 47/00 257/E29.081
5,768,223 A 6/1998 Li et al.
5,791,648 A 8/1998 Hohl
5,813,861 A 9/1998 Wood
5,823,782 A * 10/1998 Marcus .................... G09B 1/06 434/156
5,853,327 A 12/1998 Gilboa
5,906,369 A 5/1999 Brennan et al.
5,915,261 A 6/1999 Chan
5,959,281 A 9/1999 Domiteaux
6,042,004 A 3/2000 Domiteaux et al.
6,102,397 A 8/2000 Lee et al.
6,159,017 A 12/2000 Coomansingh
6,171,168 B1 1/2001 Jessop
6,179,682 B1 1/2001 Plain et al.
6,190,174 B1 2/2001 Lam
6,257,948 B1 7/2001 Silva
6,300,873 B1 * 10/2001 Kucharczyk ......... A47G 29/141 235/382.5
6,356,255 B1 3/2002 Weil et al.
6,356,626 B1 * 3/2002 Ohara .................. H04M 1/656 379/67.1
6,361,396 B1 3/2002 Snyder et al.
6,364,735 B1 4/2002 Bristow et al.
6,417,663 B1 7/2002 Piernot et al.
6,460,851 B1 10/2002 Lee et al.
6,556,184 B2 4/2003 Weil et al.
6,586,942 B2 7/2003 Lam
6,609,943 B1 8/2003 Chan
6,641,455 B2 11/2003 Chan
6,650,870 B2 11/2003 White et al.
6,659,835 B1 12/2003 Allen
6,659,836 B1 * 12/2003 Jinushi .................... G09B 1/06 273/237
6,707,777 B1 3/2004 Cherry
6,719,603 B2 4/2004 Chan
6,719,604 B2 4/2004 Chan
6,726,485 B2 4/2004 Marcus et al.
6,729,881 B2 5/2004 Marcus et al.
6,739,874 B2 5/2004 Marcus et al.
6,755,655 B2 6/2004 Marcus et al.
6,756,879 B2 * 6/2004 Shuster .................. G07F 17/12 340/5.73
6,761,634 B1 7/2004 Peterson et al.
6,761,637 B2 * 7/2004 Weston .................. A63F 13/06 463/1
6,773,325 B1 * 8/2004 Mawle .................... A63F 13/02 446/175
6,825,753 B2 * 11/2004 Cardinale ............ E05B 43/005 340/5.73
6,835,131 B1 12/2004 White et al.
6,872,660 B2 * 3/2005 Trivedi ............ H01L 21/76897 257/E21.507
6,896,573 B1 5/2005 Rogers
6,949,003 B2 9/2005 Hornsby et al.
6,952,196 B2 10/2005 Weil et al.
6,991,509 B1 1/2006 Carley et al.
6,994,556 B2 2/2006 Au
7,006,786 B2 2/2006 Marcus et al.
7,008,316 B1 3/2006 Pugh
7,018,213 B2 3/2006 Marcus et al.
7,029,283 B2 4/2006 Marcus et al.
7,033,243 B2 4/2006 Hornsby et al.
7,040,898 B2 5/2006 Marcus et al.
7,050,754 B1 5/2006 Marcus et al.
7,131,887 B2 11/2006 Hornsby et al.
7,177,707 B2 2/2007 Lam
7,214,066 B2 5/2007 Marcus et al.
7,217,135 B2 5/2007 Marcus et al.
7,338,340 B2 * 3/2008 Poesch ..................... A63H 3/16 446/100
7,347,760 B2 3/2008 Wood et al.
7,384,325 B2 6/2008 Kelly et al.
7,392,985 B1 7/2008 Lam
7,724,236 B2 5/2010 Weil et al.
7,815,112 B2 * 10/2010 Volpe .................. A47G 29/141 235/375
7,824,241 B2 11/2010 Duprey
8,296,815 B2 * 10/2012 Stokking ................ G10H 1/365 725/115
8,469,766 B2 * 6/2013 Zheng ...................... A63H 3/28 446/175
8,576,048 B2 * 11/2013 Kuenzi .................. G06Q 30/04 340/5.1
8,926,395 B2 * 1/2015 Zheng ..................... A63F 13/02 446/268
2002/0109295 A1 8/2002 Browne et al.
2003/0030441 A1 2/2003 Lam
2003/0135294 A1 7/2003 Lam
2003/0162474 A1 8/2003 Horchler et al.
2003/0207648 A1 11/2003 Avila et al.
2004/0119234 A1 6/2004 Mackey
2004/0146843 A1 7/2004 Marcus et al.
2004/0219495 A1 11/2004 Marcus et al.
2005/0137004 A1 6/2005 Wood et al.
2005/0167919 A1 8/2005 Grant et al.
2005/0248091 A1 11/2005 Neervoort et al.
2005/0280630 A1 12/2005 Weil et al.
2006/0175753 A1 8/2006 MacIver et al.
2007/0009866 A1 1/2007 Marcus et al.
2007/0135934 A1 6/2007 Lam
2007/0197129 A1 8/2007 Robinson
2008/0211183 A1 9/2008 Cortenraad et al.
2008/0297317 A1 12/2008 Oberle
2011/0070805 A1 3/2011 Islava
2011/0130202 A1 6/2011 Smith et al.
2012/0142248 A1 6/2012 Murayama et al.

FOREIGN PATENT DOCUMENTS

EP 0529596 B1 1/1997
EP 1228796 B1 7/2004
FR 2572300 A1 5/1986
JP 05317110 A 12/1993

(56) References Cited

FOREIGN PATENT DOCUMENTS

| | | | |
|---|---|---|---|
| JP | 2006230628 | A | 9/2006 |
| JP | 2006236024 | A | 9/2006 |
| WO | 2006/056929 | A1 | 6/2006 |

* cited by examiner

KEYED MEMORY DEVICE TO RECORD INPUT USER SIGNALS AND OUTPUT RECORDED USER SIGNALS

FIELD OF THE INVENTION AND CROSS-REFERENCE TO RELATED APPLICATIONS

The present invention relates to an electronic device, and in particular, to a keyed memory storage device that provides specific output signals in response to keyed or coded input signals. This application claims priority to and the benefit of U.S. Provisional Application No. 61/707,065, filed Sep. 28, 2012.

BACKGROUND OF THE INVENTION

Various electronic devices are known that interact with users based upon user input. For example, electronic toy products are known that are configured to emit pre-recorded sounds in response to some form of user input. In addition, some electronic toy products are configured to output specific signals based upon different user input signals.

It would be desirable to provide a system that combines the features of facilitating recording of user input signals (e.g., audio and/or video signals) and outputting the recorded signals based upon specific code signals input by a user of the system.

SUMMARY OF THE INVENTION

In one embodiment, an electronic system is configured to receive input content (e.g., audio content, video content and/or other content) from a user and convert the input content to input signals (e.g., audio signals, video signals, etc.) that are stored in an electronic storage device or storage medium comprising a tangible memory, where the input signals correspond with specific code signals received at or around the time of storage. The recorded input signals are output based upon re-receiving the specific code signals input to the electronic device at a later point in time. For example, the electronic system can include an electronic device and at least one accessory associated with the electronic device, where the accessory includes an accessory code that is readable by a code reader of the electronic device.

In an example embodiment, an electronic system comprises an electronic device with a housing that includes the code reader, a memory to store input content as well as other data, and a controller operable to access signals readable by the code reader as well as recorded signals and other data from the memory and convert the recorded signals to output content based upon accessory code information input utilizing an accessory.

In another example embodiment, an electronic toy comprises a toy accessory including a toy accessory code, and an electronic toy housing. The electronic toy housing includes a code reader operable to interface with the toy accessory, and generate a toy accessory code signal that corresponds with the toy accessory code. The electronic toy housing further includes an input device operable to receive content from a user and convert the content into an input signal, an output device operable to convert the input signal into the content for output by the output device, a memory operable to store the toy accessory code signal and the input signal from the input device and operable to send a stored input signal to the output device, and a controller operably connected to each of the code reader, the input device, the output device, and the memory. The controller is operable to associate a first toy accessory code signal received from the code reader with a first input signal received by the input device and stored within the memory, determine whether an input toy accessory code from the code reader corresponds with the first toy accessory signal, and activate the output device to receive the first input signal from the memory and output the content in response to a determination that the input toy accessory code from the code reader corresponds to the first toy accessory signal.

In another example embodiment, the electronic toy comprises a storage box configured to store objects, and the at least one accessory comprises one or more keys that engage with a keyhole provided in the storage box to facilitate engagement between the accessory code of each key and the code reader of the storage box. Input devices for the storage box can comprise a microphone and/or a camera, and output devices for the storage box can comprise a speaker and/or an image display.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF THE INVENTION

An electronic system is configured to receive input content (e.g., audio content, video content and/or other content) from a user and convert the input content to input signals (e.g., audio signals, video signals, etc.) that are stored in an electronic storage medium, where the input signals correspond with specific code signals received at or around the time of storage. The recorded input signals are output based upon re-receiving the specific code signals input to the electronic device at a later point in time. For example, the electronic system can include an electronic device and at least one accessory associated with the electronic device, where the accessory includes an accessory code that is readable by a code reader of the electronic device.

Figure 1:
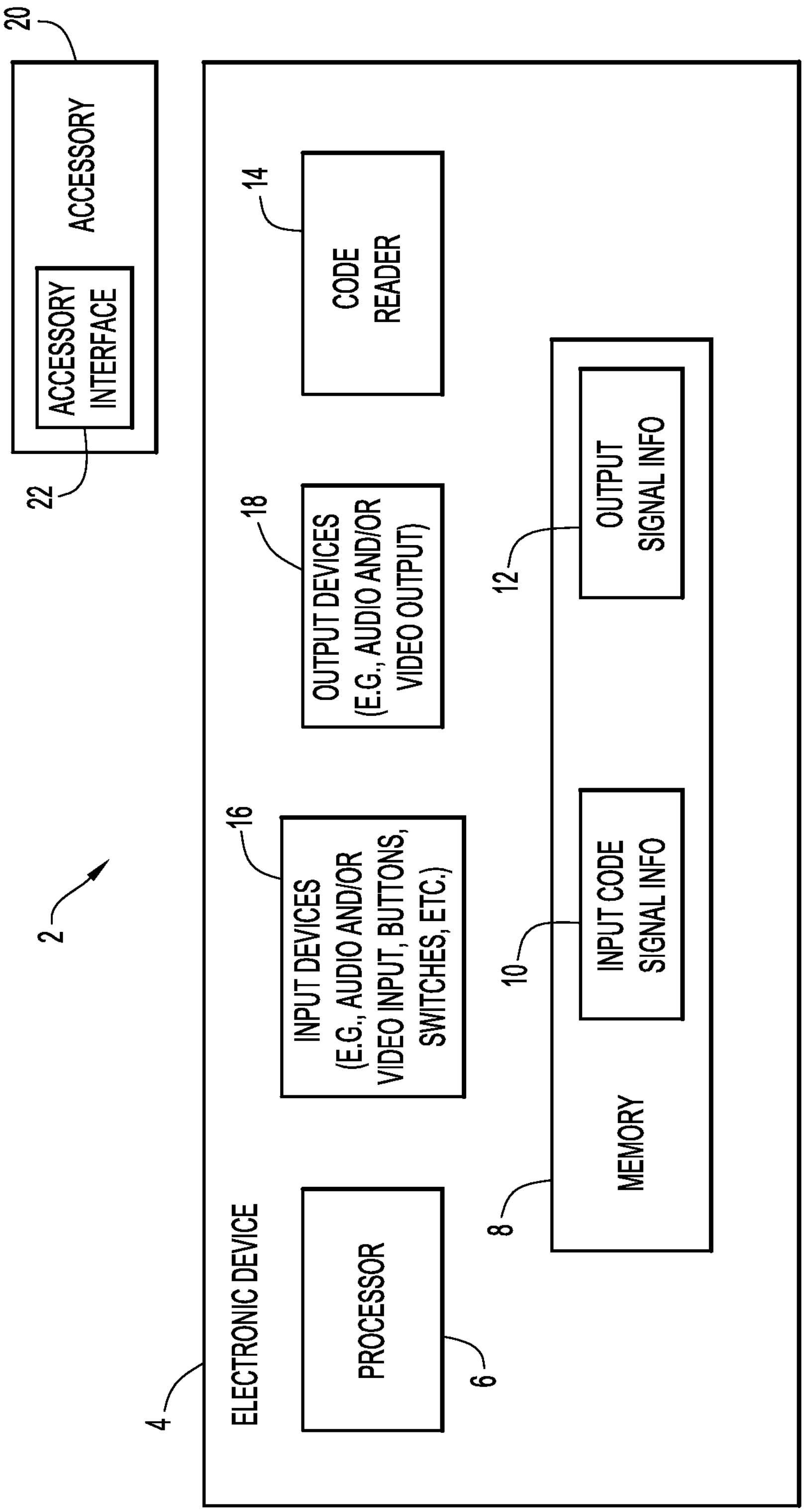
FIG. 1 illustrates a schematic block diagram of a system including an electronic device and an accessory according to an embodiment of the present invention.

Referring to FIG. 1, an example embodiment of a schematic diagram of a system 2 is presented that comprises an electronic device 4 and at least one accessory 20 associated with the electronic device 4. Each accessory 20 includes an accessory interface 22 that interfaces in some suitable manner with a code reader 14 of the electronic device 4 to facilitate reading of an accessory code of the accessory 20.

The electronic device 4 includes a controller in the form of a processor 6, where the processor 6 can be any suitable microprocessor or microcontroller that is operable to implement electronic operations of the device 4 by executing control process logic instructions that are either integrated as part of the processor 6 or are stored (e.g., as software) within a memory 8 of the device 4 and that are accessible by the processor 6. The memory 8 of the device can be implemented by any conventional or other suitable memory storage device, and may include any suitable storage capacity. For example, the memory 8 may comprise computer readable storage media in the form of read only memory (ROM) and/or random access memory (RAM), where the computer readable storage media is further implemented in the form of a physical/tangible memory storage device. The processor 6 and memory 8 can be implemented on the same or different circuit boards provided in one or more suitable locations within the electronic device 4. In some embodiments, the processor 6 and memory 8 are implemented within the same integrated circuit package. The memory 8 further stores input code signal information 10 and output signal information 12, described in further detail herein.

The electronic device 4 further includes one or more input devices, represented generally in FIG. 1 as input devices 16, as well as one or more output devices, represented generally in FIG. 1 as output devices 18. Example embodiments of suitable input devices 16 include, without limitation, input keys (e.g., one or more mechanical buttons or switches, a keyboard or keypad, touch screen or touch pad, etc.), one or more microphones to facilitate input of audio signals by a user, one or more image sensors or cameras to record still and/or video images, etc. Example embodiments of suitable output devices 18 include, without limitation, output visual indicators (e.g., LED lights), one or more speakers to facilitate output of audio signals including pre-recorded audio signals input by a user, one or more displays (e.g., an LCD display) to output video signals including pre-recorded still and/or video images input by a user, etc. The processor 6 is configured to process input signals received via the input devices 16 for storage within memory 8 and also process output signals stored within memory 8 for output via the output devices 18.

The accessory interface 22 of the accessory 20 can be used to interface with the code reader 14 of the electronic device 4 to facilitate both an input of coded signals for storage by the memory 8, as well as retrieval and output of recorded signals by the memory 8.

The interface between the accessory interface 22 and the code reader 14 can be any suitable interface that facilitates recognition of the specific accessory 20 by the code reader 14 so as to facilitate a coding of an input signal that is to be associated with the accessory 20. For example, the interface between each accessory 20 and the code reader 14 can be an electro-mechanical interface, in which the accessory interface 22 of the accessory 20 comprises bumps, grooves, indentations and/or any other suitable physical pattern and the code reader 20 comprises suitably aligned electrical switches that, when engaged with a unique physical pattern of an accessory interface 22, results in a corresponding engagement with and closing of certain electrical switches (e.g., closing of some number and/or pattern of switches while other switches remain open, closing of all the switches, or leaving all of the switches open). The corresponding pattern of closed switches caused by engagement with the unique pattern of the accessory interface 22 for a specific accessory 20 produces a specific electrical signal that is readable by the processor 6 and that identifies the specific accessory 20 currently or actively engaged with the code reader 14. For example, the switches can be provided as part of an electrical circuit of the code reader 14, such that a selected pattern and/or number of open and closed switches results in a unique electrical signal from the electrical circuit when an electrical current is applied to the circuit (e.g., by the electronic device 4). The switches can further be configured to have a suitable resilient bias such that, upon removal of engagement between the accessory interface 22 and the switches, the switches resiliently revert back and are restored to their original positions (e.g., switches that were closed by engagement with the accessory interface 22 revert back to their original, opened positions upon disengagement with the accessory interface 22).

Alternatively, any other suitable interface between each accessory 20 and the code reader 14 can be provided that would also result in recognition of a specific accessory 20 by the code reader 14. In some embodiments, the interface includes an optical-electronic interface, such as a one- or two-dimensional bar code. The code reader 14 includes an infrared scanner that scans the accessory interface 22 that includes bar code indicia to recognize the specific accessory 20. In other embodiments, the interface includes a graphic design, such as a logo or symbol. An image sensor of the code reader 14 is configured to send an image of the graphic design to a processor that is programmed to recognize the graphic design and associate it with the specific accessory 20.

In an example embodiment of operation, the accessory interface 22 of an accessory 20 interfaces with the code reader 14 of the electronic device 4 to facilitate capturing of input content by the user by an input device 16, where the input device 16 converts the input content to an input signal, where the input signal can comprise an audio signal, a video signal or a combined audio and video signal. In some embodiments, the facilitation of capturing content occurs by the code reader 14 providing an index for the input signal, such that the input signal may be readily retrievable when stored. In other embodiments, the input signal represents textual information input by the user (e.g., one or more letters or words input using a keyboard, keypad, touch screen or any other suitable input device for the electronic device).

The electronic device 4 includes a suitable input device, such as one or more mechanical buttons (as part of the input devices 16), that can be activated or pressed by a user (e.g., before interfacing the accessory 20 with the code reader 14) to provide an indication that content is to be input by the user for conversion to an input signal and coding with the accessory 20. After interfacing the accessory 20 with the code reader 14, the user inputs the content (e.g., audio content comprising one or more words, phrases or sounds presented by the user and captured by a microphone of the electronic device, video content comprising an image or video clip captured by a camera of the electronic device 4 and/or textual content comprising one or more letters or words captured by an input keyboard of the electronic device 4) that is converted to the input signal by the input device 14, and the input signal is processed by the processor 6 and stored as output signal information 12 within memory 8. The specific output signal information 12 is further coded by storing input code signal information 10 that corresponds with the specific output signal information 12, where the input code signal information 10 represents the code signal that is read by the processor 6 at the code reader 14 as a result of the interface between the code reader 14 and the accessory interface 22 of the accessory 20. Alternatively, the input code signal that is read by the processor 6 at the code reader 14 can represent a memory address (or a pointer to a memory address) located within the memory 8 that facilitates retrieval of the specific output signal information that corresponds with the input code signal (thus obviating the need to store input code signal information).

In another example embodiment, interfacing a specific accessory interface 22 for an accessory 20 with the code reader 14 of the electronic device 4 retrieves a user input signal that has been stored as output signal information 12 within memory 8. The processor 6 reads the code signal from the interface 22 at the code reader 14 and compares it with input code signal information 10 stored in memory 8. In response to finding a match of the code signal with input code signal information 10, an output device 18 of the electronic device 4 outputs the output signal information 12 that corresponds with the matched input code signal information 10 (e.g., output as a recorded audio signal, a recorded image or video clip and/or a recorded text message). Alternatively, in another example embodiment, an appropriate input code signal from the interface 22 serves as an address or address pointer to a storage location within memory 8 in which the corresponding input code signal information 10 is stored, and the input code signal information 10 at such memory storage location is retrieved and output by the output device 18. The output device 18 converts a recorded signal of the output code signal information 12 into content for output by the output device 18 (e.g., converting an audio signal into output audio content by a speaker, converting a video signal into output video content by a display, converting a text signal into output textual content by a display, etc.).

Thus, the system 2 of FIG. 1 provides a feature of capturing and recording input content by a user (e.g., audio, video and/or textual content) as a coded input signal by the electronic device 4 using a specific accessory 20, and then subsequently recalling for output the same recorded signal based upon interfacing the specific accessory 20 with the electronic device 4. The system 2 is further configured to capture and record/store multiple input signals corresponding with content input by a user, where each input signal is coded to a different corresponding accessory 20, and the accessory interface 22 for each accessory 20 is distinguishable from the accessory interface 22 of each other accessory 20 such that the code signal information provided by the accessory interface 22 can be matched or coded with a specific input signal representing content input by the user.

An example embodiment of implementing the system of FIG. 1 as an electronic toy is depicted in FIGS. 2-9. In particular, the electronic toy can be implemented with the electronic device 4 comprising a toy storage box 104, and the accessories 20 comprising one or more keys 120 that engage with a keyhole 162 formed within the box 104 to facilitate identification of each key 120 via the code reader 14 provided within the box 104 (as described herein). While the base of the box 104 has a generally rectangular configuration, as shown in the drawings, it is noted that the box 104 or the base of the box 104 can alternatively include any suitable shape and configuration (e.g., heart shape, circular shape, etc.). In addition, it is noted that the depiction of specific locations of components of the box 104, as described herein and shown in FIGS. 2-9, is for example purposes only. It is noted that the toy storage box can have any suitable configuration with components placed or located at any other suitable locations of the box.

Figure 3:
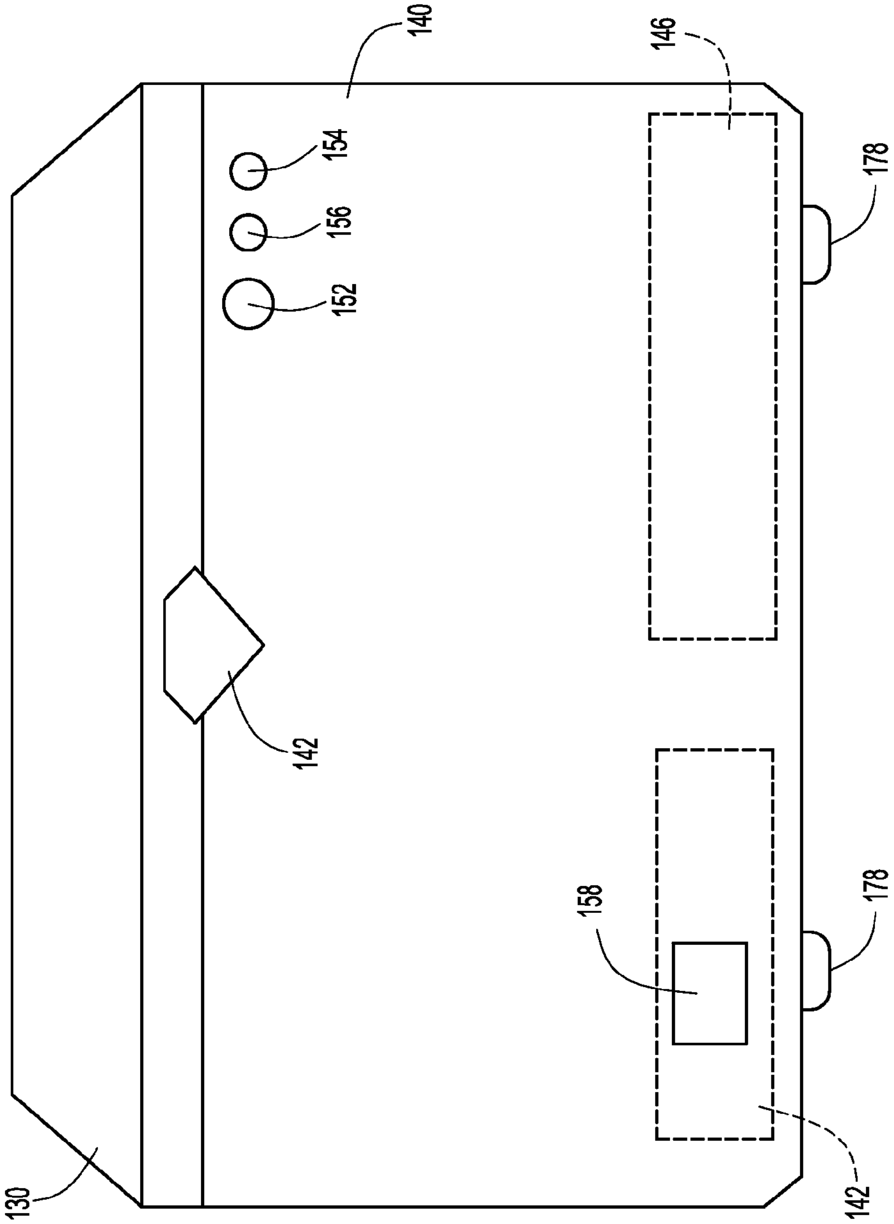
FIG. 3 is a front view of the toy storage box of FIG. 2.

The toy storage box 104 includes a hollow housing 140 and a lid 130 that is pivotally securable to a top portion of the housing 140 (via a hinge connection at an upper rear surface edge of the housing 140 and a corresponding lower rear surface edge of the lid 130) in order to selectively open and close the housing 140. The housing 140 includes an internal compartment 144 that is accessible when the lid 130 is opened and is suitably dimensioned to store objects (e.g., accessories 20 and other toys or objects as described herein). The housing 140 also includes a secret compartment 146 (FIG. 3). In some embodiments, the secret compartment 146 may be accessed (e.g., via a cover or lid) from a lower or bottom surface of the housing 140, where the secret compartment 146 is separate from and non-contiguous with the main compartment 144 within the housing 140. In other embodiments, the secret compartment 146 may be accessed from a lower or bottom surface of the internal compartment 144. The housing 140 is supported on a support surface by a plurality of feet 178 extending from the bottom housing surface. In addition, a battery compartment 142 is provided at a lower surface portion of the housing 140, where the battery compartment 142 can also be accessible from the bottom housing surface (e.g., via a compartment cover or lid) to facilitate replacement of batteries (e.g., AA batteries) that provide electrical power for the electronic components of the toy. Alternatively, or in addition to a battery power supply, the toy can include any other suitable power supply (e.g., a power cord) to provide electrical power to the toy.

Figure 2:
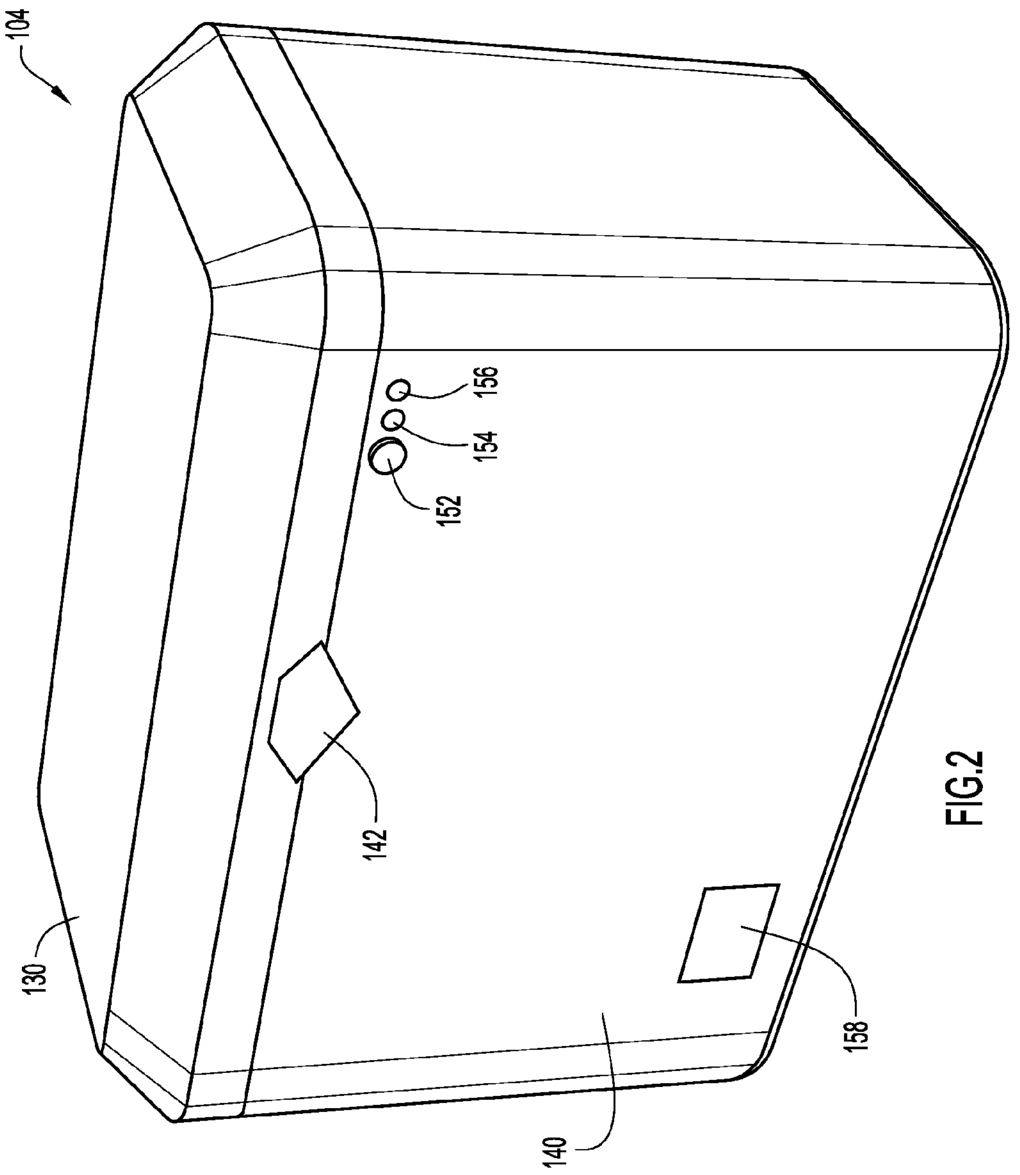
FIG. 2 is a front view in perspective an example embodiment of the system of FIG. 1, in which the system is implemented in the form of the electronic device comprising a toy storage box and the accessory comprising a plurality of keys that interact with the toy storage box.

A latch mechanism for facilitating the opening of the toy box includes a latch 142 that connects with the housing 140 and includes a suitable engaging structure to releasably connect with corresponding engaging structure at a corresponding lower front surface portion of the lid 130 so as to facilitate a latched securing of the lid 130 to the housing 140. The front surface of the housing 140 also includes input devices 16 in the form of an open button 152 (to facilitate opening of the box 104 via the latch 142 as described herein), and a microphone 156 (to facilitate input of audio signals for storing within memory 8 as described herein), where the open button 152 and microphone 156 are located at or near an upper right corner of the front surface of the housing 140. The front surface of the housing 140 further includes output devices 18 in the form of an LED signal light 154 located at or near the upper right corner of the front surface of the housing 140 and a speaker 158 located at a lower surface portion of the housing front surface. However, it is noted that the input and output devices could also be located at any other suitable outer surface and/or any other portions of the housing 140. For example, in some embodiments, the latch (e.g., latch 142 as depicted in FIG. 2) could also be configured to include a latch cover that also serves as an open button (e.g., an open button with the same functional features as open button 152), as well as an LED signal light (e.g., an LED light with the same functional features as LED signal light 154) all of which are integrated as a single component.

Figure 4:
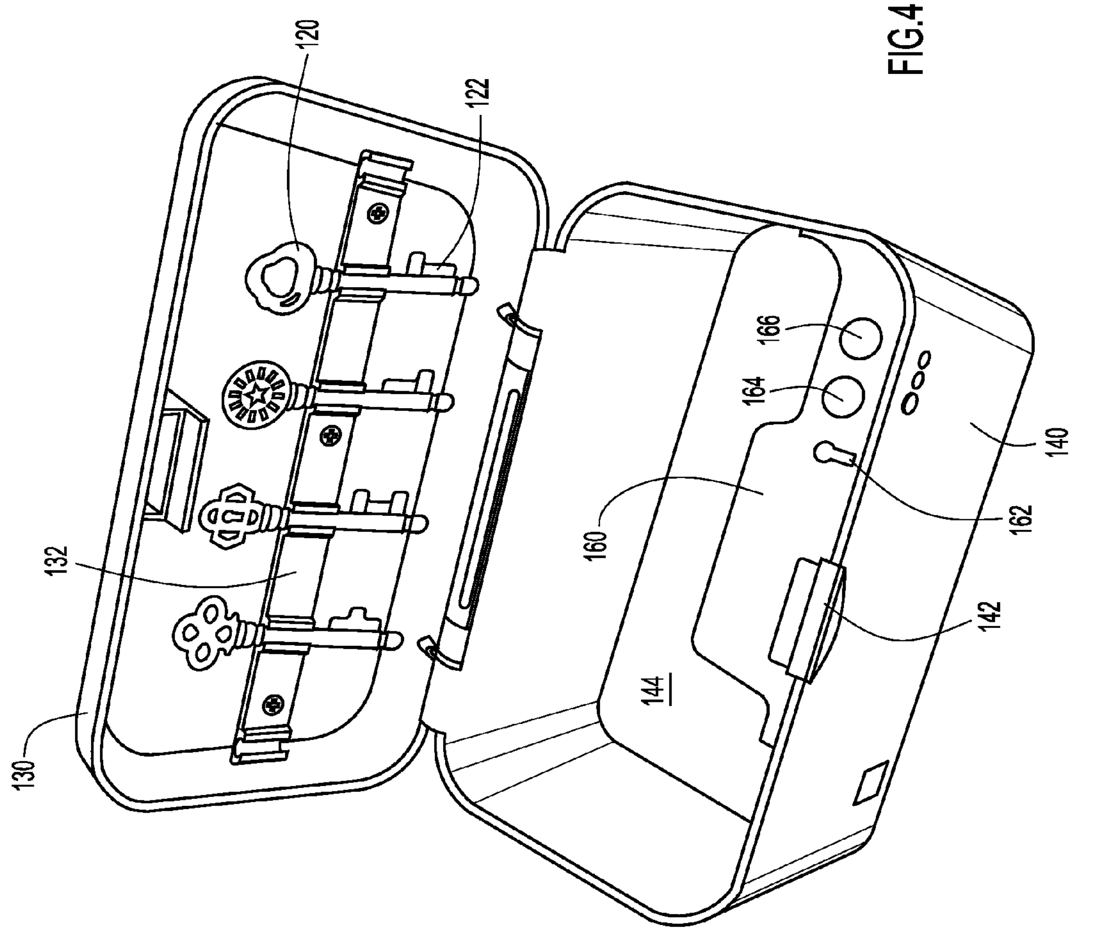
FIG. 4 is a top view in perspective of the toy storage box of FIG. 2 with lid open to show the compartment within the toy storage box.
Figure 5:
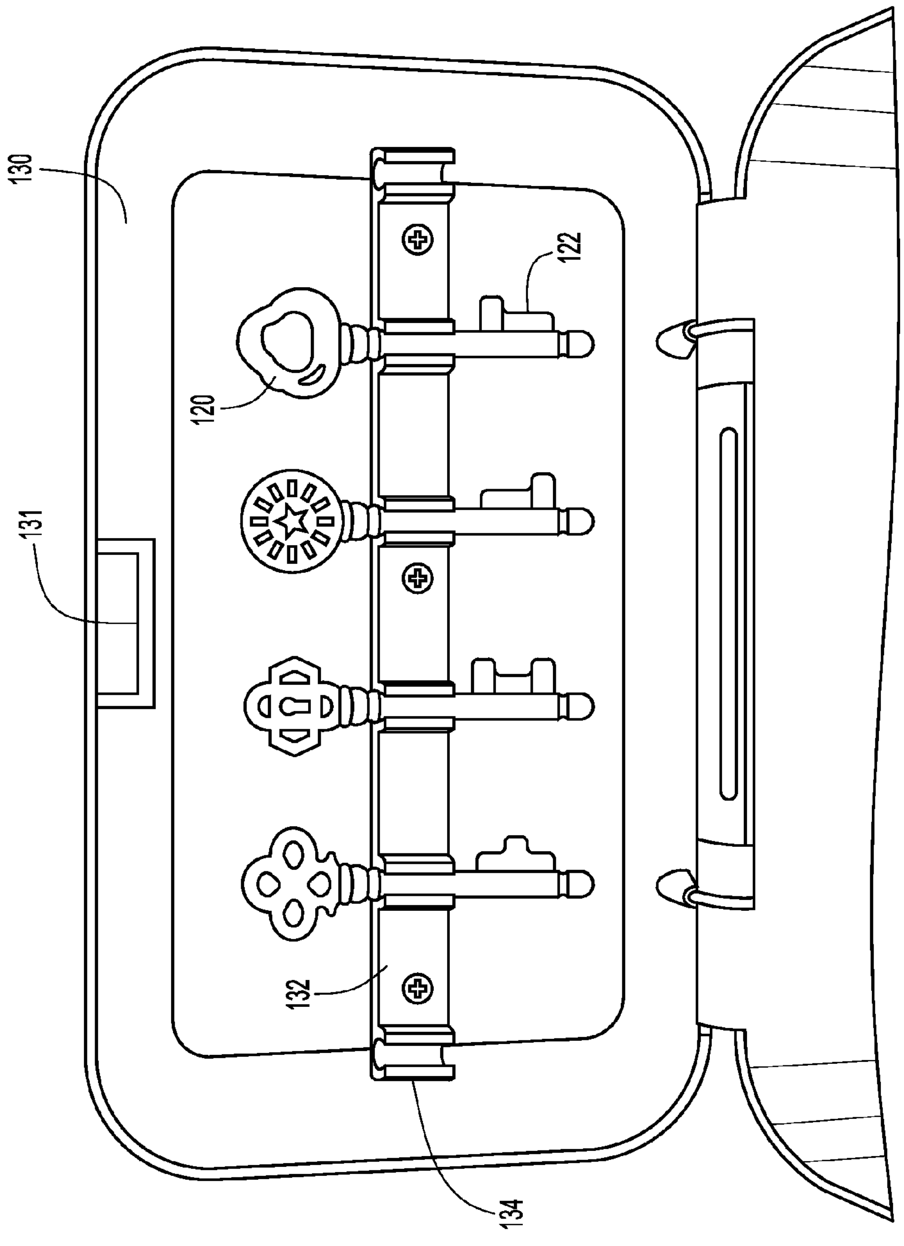
FIG. 5 is a partial front view of the toy storage box of FIG. 2 including a view of the underside of the lid with keys secured to the lid underside.
Figure 6:
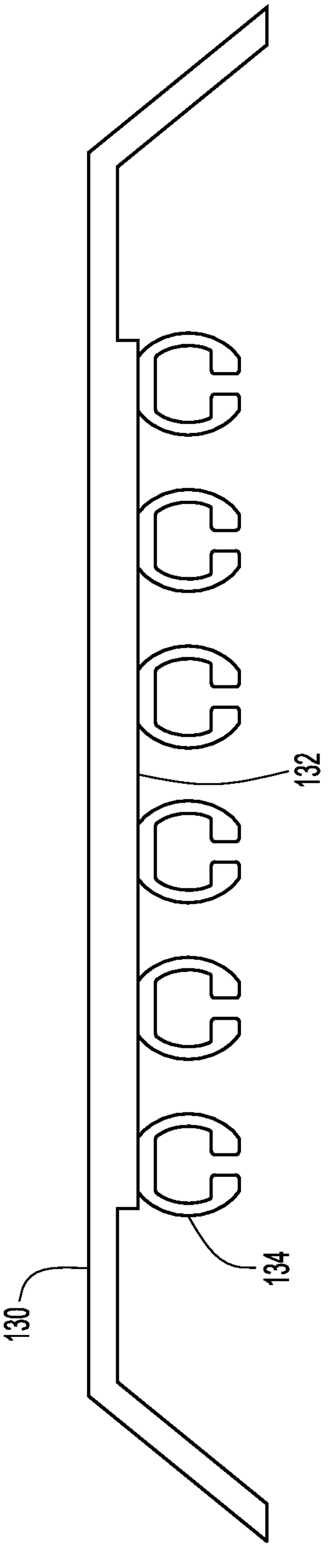
FIG. 6 is a side view of the lid of the storage box of FIG. 2 including a view of securing structure to secure keys to the underside of the lid.

Referring to FIGS. 4-6, the lid 130 includes an accessory storage structure, shown here in the form of a key storage structure 132, provided along an underside of the lid 130 and configured to hold and store one or more accessories, shown here in the form of keys 120, within the compartment 144 of the box 104 when the lid 130 is latched with the housing 140. In particular, the key storage structure 132 has a generally elongated configuration and includes a plurality of storage clips 134 extending from the key storage structure 132. As best viewed in FIG. 6, each storage clip 134 includes two resilient and spaced apart fingers that are configured to receive and releasably retain a key 120 when the key 120 is fit between the clip fingers. When keys 120 are engaged with the storage clips 134 of the key storage structure 132, the keys 120 are retained and thus move with the lid 130 to facilitate storage of the keys 120 within the box compartment 144 when the lid 130 is closed.

Each key 120 includes an accessory interface 22 in the form of a key structure 122 comprising a pattern of bumps or protrusions and indentations, where the key structure 122 for each key 120 is distinguishable from the key structures 122 of other keys 120 (see, e.g., FIG. 5). Each key 120 can be color coded with a different color to provide a further unique distinction from other keys 120.

Figure 7:
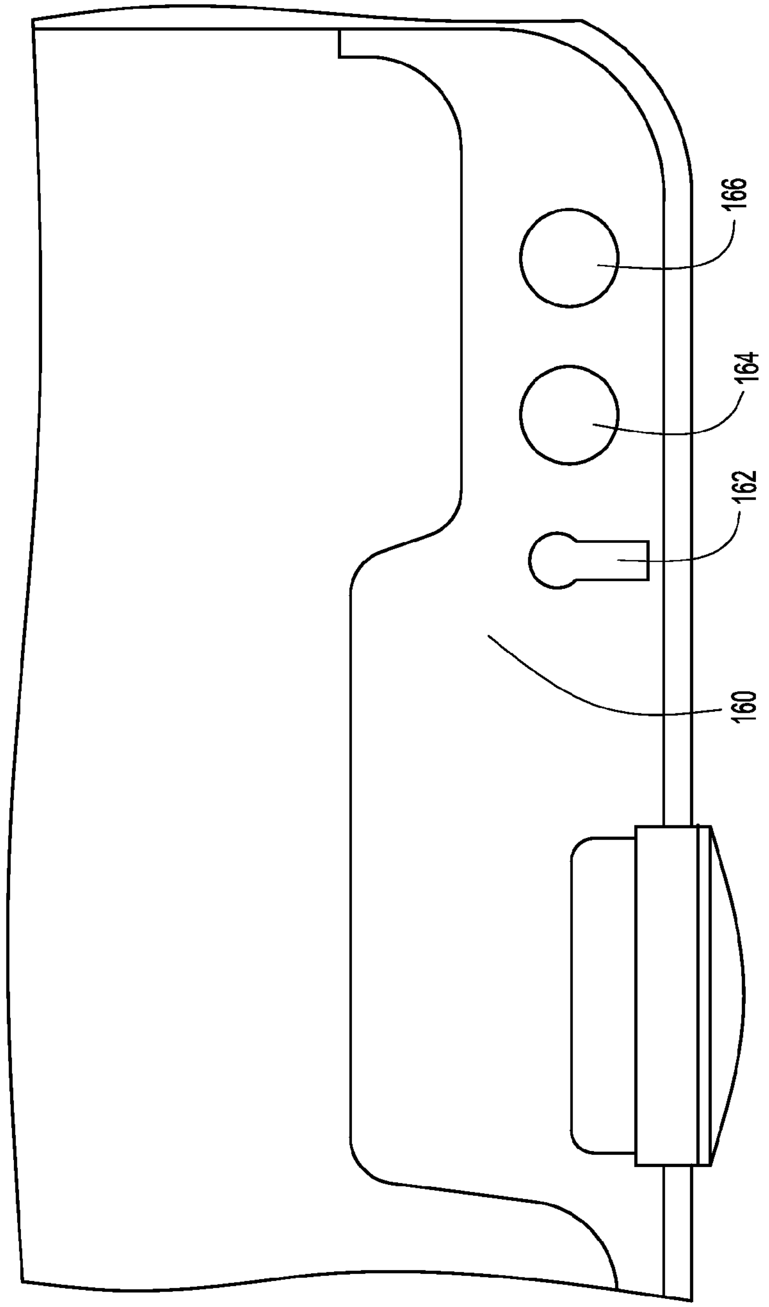
FIG. 7 is a top view in plan of a portion of the toy storage box of FIG. 2 with lid open to show a keyhole for receipt of keys as well as other features associated with the toy storage box.
Figure 8:
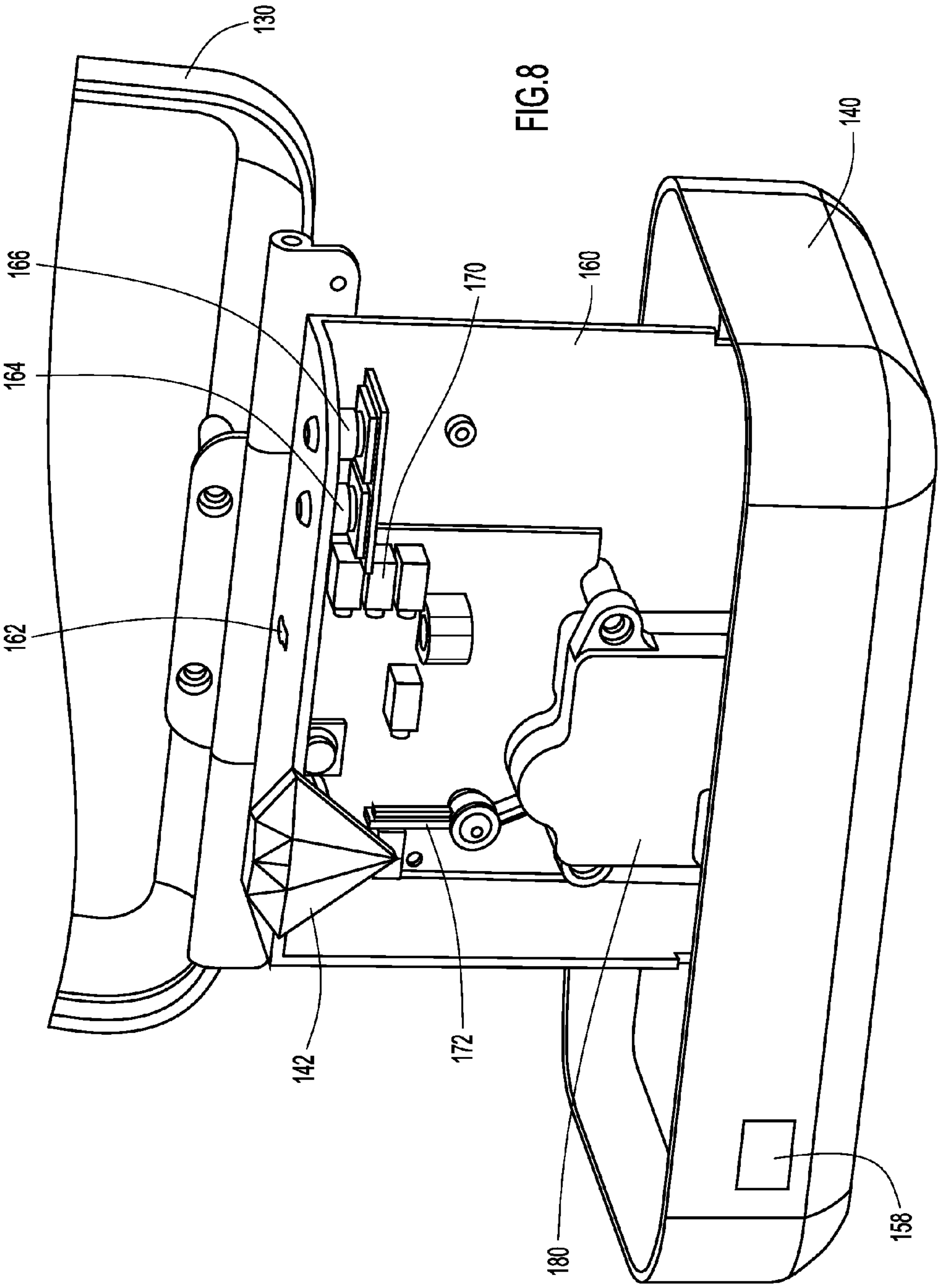
FIG. 8 is a partial view of the toy storage box of FIG. 2 including a partial view in section of the housing and a partial view in section of the electronics compartment that contains electronic components of the toy storage box.

Referring to FIGS. 4, 7 and 8, an electronics housing compartment 160 is located within the main housing compartment 144, extending from an interior surface of the housing front wall and defining a widened upper edge portion at the housing front wall. At this widened upper edge portion of the housing front wall, a keyhole 162 is defined (e.g., near the right edge of the housing front wall). The top front edge portion of the housing 140 also includes input devices 16 in the form of a security button 164 and a memory button 166, the functions of which are described herein. Located within the electronics housing compartment 160 are various electronics components, including the code reader 14, the processor 6, memory 8, security button 164 and memory button 166, and an automatic latching mechanism for the latch 142 as described herein. As previously noted, the processor 6, memory 8, as well as portions of input and output devices 16, 18 (e.g., circuit wiring associated with input buttons, light indicators, the microphone and the speaker) can be disposed on one or more circuit boards that are disposed within the electronics housing compartment 160, where the circuit boards include suitable electrical connections to facilitate access to information from memory 8 by the processor 6 as well as execution of operations by the processor 6 in association with the various input and output devices as well as the automatic latching mechanism associated with the latch 142.

The keyhole 162 is suitably designed and dimensioned to receive a portion of each key 120 including its key structure 122, where the code reader 14 is located within the electronics housing compartment 160 and is configured to engage with the key structure 122 of a key 120 that is fit within the keyhole 162 during operation of the toy box 104. The code reader 14 of the toy storage box 104 comprises a series of resilient switches 170 (FIG. 8) located within the electronics housing compartment 160, where the switches 170 are initially in an open position. Bumps or protrusions on the key structure 122 of a key 120 engage with certain corresponding switches 170 when the key 120 is inserted within the keyhole 162. The protrusions move these switches 170 from their original, open positions to a closed position. The key structure 122 for each key 120 has a different bump/protrusion pattern so as to close some or all of the switches in a different manner from each of the other keys 120 when the key structure 122 of each key 120 is inserted within the keyhole 162. The switches 170 are provided within a circuit of the code reader 14 that generates a different electrical signal for use by the processor 6 that depends upon which switches are closed when a current is applied to the circuit. The output electrical signal from the circuit, which is based upon which switches 170 are closed in the circuit, serves as a unique key code signal associated with a key 120 for providing a detection and identification to the processor 6 regarding which (if any) key 120 is within the keyhole 162 at a given time. When a key 120 is removed from the keyhole 162, the resilient switches 170 that were engaged with the key structure 122 resiliently move back to their original, open positions (e.g., via a spring bias associated with each switch). Thus, when no key 120 is within the keyhole 162, each switch 170 is in an open position and an electrical signal from the circuit provides an indication to the processor 6 that no key 120 is in the keyhole 162.

A motor 180 is also provided within the electronics housing compartment 170. The motor 180 is coupled with the latch 142 via a mechanical linkage 172, so as to provide an automatic latching mechanism for the toy storage box 104. Selective operation of the motor 180 translates to movement of the latch 142 into locked and unlocked positions for the lid 130 in relation to the housing 140 when the lid 130 is in a closed position. The latch 142 engages with the corresponding latching structure of the lid 130. Operation of the motor 180 can be controlled by a user, via the processor 6, when the user engages the open button 152 on the front surface of the housing 140 as described herein.

Figure 9:
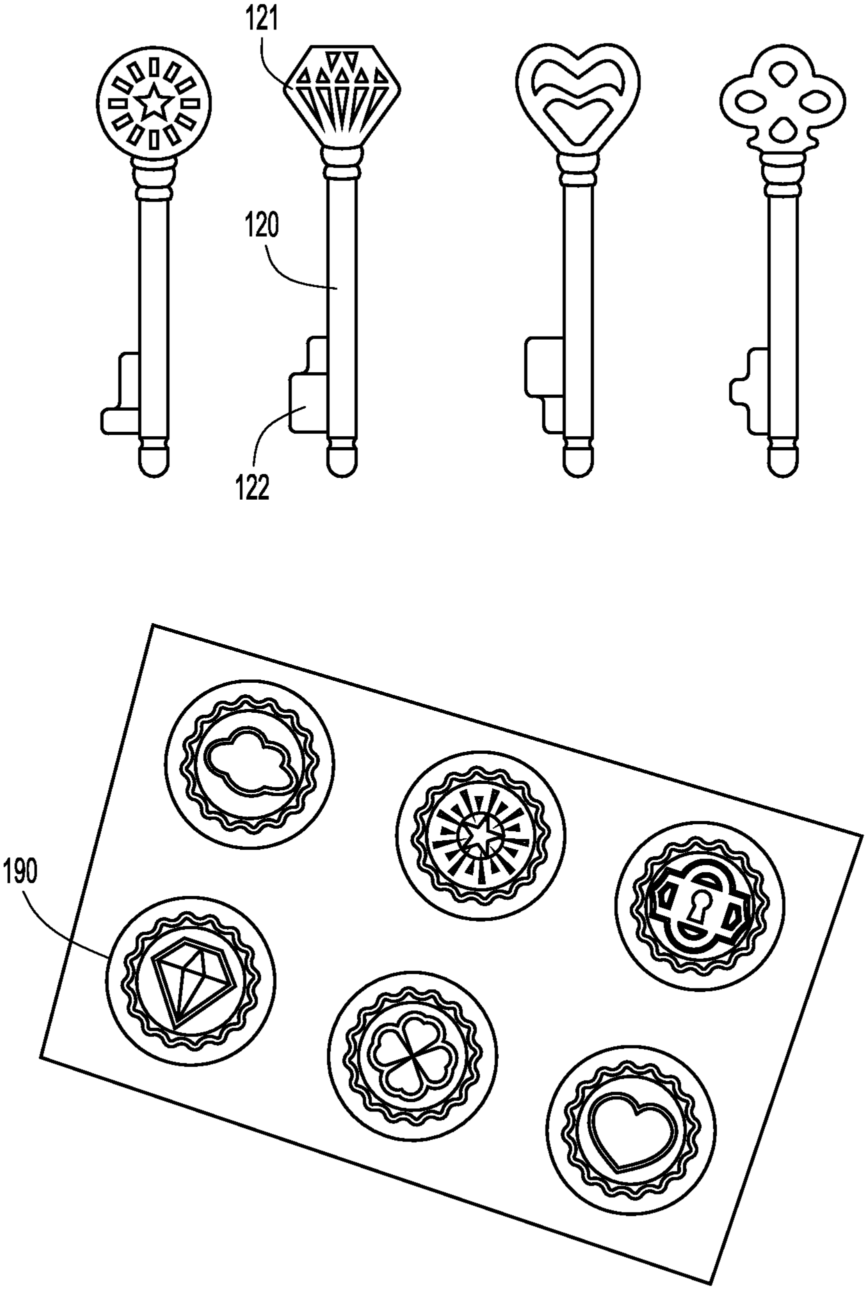
FIG. 9 is a view of keys with corresponding stickers used in combination with the keys as described herein in an example embodiment.

Referring to FIG. 9, a plurality of keys 120 is depicted, with each key 120 including one or more identifiable features 121 imprinted or defined in a suitable manner on the key 120 that is distinguishable from each other key 120. The distinguishable features may be of a physical or graphical nature, or may be based on visual indicators, such as color. For example, one key 120 may include a heart shaped feature 121, another key 120 may include a diamond or clover shaped feature 121, etc. A corresponding plurality of markers in the form of stickers 190 is also depicted, where each sticker 190 includes printed indicia that corresponds with a key 120 (e.g., a sticker 190 with heart shaped indicia printed thereon corresponds with a key 120 having a heart shaped feature 121, etc.). Each sticker 190 may also be color coded to correspond with the color of its corresponding key 120 (e.g., the sticker 190 with heart shaped indicia printed thereon can be the same color as the corresponding key 120 having a heart shaped feature 121, etc.). The stickers 190 can be applied to objects that are to be placed within the compartment 144 of the housing 140. As further described herein, this allows a user to associate recorded audio (and/or other) content stored by the memory 8 of the toy box 104 with both a corresponding key 120 and an object upon which a corresponding sticker 190 is applied. Each sticker 190 may include a sticking side that opposes the side including the printed indicia, where the sticking side includes any suitable adhesive or other securing structure that facilitates removable or non-removable adhesion to at least one surface of an object to be stored within the toy box 104. Alternatively, any other suitable marker that can be linked or associated with an object can also be provided, such as a sculpted plastic disc with an adhesive backing.

Various modes of operation of the toy storage box 104 are now described with reference to FIGS. 2-9. Initially, it is noted that, when the lid 130 is closed upon the housing 140 such that the housing latch 142 engages the corresponding latching structure provided on the lid, the box 104 can be locked, either by the motor 180 moving the latch 142 to a lock position or by a resilient mechanical latching that occurs by simply engaging the latch 142 with the corresponding latching structure in the lid 130. Unlocking/unlatching of the latch 142 to facilitate pivotal movement of the lid 130 from the housing 140 (so as to expose the inner housing compartment 144) can be achieved by the user pressing the open button 152 on the front surface of the housing 140. The processor 6 detects activation of the open button 152 by the user and controls the motor to move the latch 142 to an unlocked position.

In some embodiments, a password may be required to unlock the latch 142 and open the box 104. The security button 164 (which is accessible only when the lid 130 is moved to the open position) can be utilized to control security functions or security levels for the box 104. For example, the security button 164 can be utilized to toggle between different levels of security including, without limitation, an “off” setting (no password required to open box), a low security setting (some basic level password required to open box), and a higher security setting (more complex password or passwords required to open box). In embodiments where a password is required to open the box 104, an initial input of the password can be performed by the user utilizing an appropriate one or more input devices 16. For example, an audio password (e.g., a word or phrase stated by the user) can be input by using the microphone 156 during an initial setup of the toy storage box 104 (e.g., during a first use of the toy storage box by the user), where the open button 152 can also be pressed by the user during recording of the audio password (to indicate start and stop time of the recording). The input password (e.g., audio command) by the user can be converted to a password signal that is stored within memory 8 and corresponds with the security level set by the security button 164 at the time the password is input by the user. The user will then be required to provide the password (e.g., state the same audio command) that is stored within memory 8 and that is associated with the security level as set by the security button 164 when trying to unlock the latch 142 to open the box 104.

Thus, when a password is required to open the box 104 (i.e., the security button 164 is set at a security setting other than “off” and a password has been previously input by the user in correspondence with the security setting), the user must first press the open button 152 to provide an indication to the processor 6 that opening of the box is desired. In response to detecting activation of the open button 152, the processor prompts the user to input the password. For example, the processor 6 can facilitate the output of an audio sound effect (e.g., an audio command such as “PLEASE ENTER PASSWORD”) via the speaker 158 and/or any suitable visual signal, such as activation of the light indicator 154, to notify the user to enter the password. In response to the user providing the correct password (e.g., the user states the correct password into the microphone 156, which is converted into a signal that is compared by the processor 6 with the stored password signal to confirm a match), the processor 6 activates the motor 180 to achieve an unlocking of the latch 142. The processor 6 can further provide another audio sound effect and/or any other suitable output signal indicating when the user has provided an incorrect password (e.g., an audio command such as “INCORRECT PASSWORD”, “DOESN’T MATCH”, “ACCESS DENIED”, etc.). In an alternative embodiment, the user may simply enter the password without the need to press the open button 152 (e.g., detection of audio content can occur by the user simply speaking into the microphone 156).

The box 104 can optionally be provided with the feature of a second password to open the cover or lid of the secret compartment 146, where input of the second password by the user can be performed in a similar manner as that for setting a password for the lid 130 of the box 104. Alternatively, the password for opening the cover or lid of the secret compartment 146 can be the same as the password for opening the lid 130 of the box 104. In such embodiments, the cover or lid of the secret compartment 146 is provided with a motor or similar mechanism as the lid 130 that is controlled, e.g., by processor 6 to facilitate unlocking and opening of the secret compartment cover or lid when the correct password is provided by the user.

When the lid 130 is in an open position, the user can retrieve objects stored within the box compartment 144. The user can also utilize keys 120 to record and store coded input information as input signals within the memory 8 of the storage box 104. The coded information comprises audio content input by the user using the microphone 156. However, and as previously noted, the box can also be configured to receive and store other forms of information including, without limitation, still and/or video images (e.g., via a camera implemented with the box) and text (e.g., via a keyboard implemented with the box).

In an example embodiment of operation in which a user inputs audio content for storage within the memory 8 of the box 104, the user presses the memory button 166 located at the top edge portion of the housing 140. The memory button 166 can have various toggle settings, so as to provide a record function as well as other functions (e.g., playback of a recorded message function). Different commands or other suitable sound effects can be stored in memory 8 and controlled by the processor 6 for playback by the speaker 158 to provide an indication of what is the current functional mode of operation of the box 104. For example, a first press of the memory button 166 can provide the functional mode of recording an audio signal, where an audio sound effect (e.g., “PLEASE RECORD YOUR MEMORY”) can be output by the speaker 158. A second press of the memory button 166 (that is within a select time period from the first press) can provide the functional mode of playing back a recorded audio word or phrase, with a suitable audio sound effect (e.g., “PLAYBACK A RECORDED MEMORY”) being output by the speaker 158.

The processor 6 detects activation of the memory button 166 in the mode of recording audio content that is input by the user (e.g., based upon the user activating the memory button 166 only a single time). The user then picks a key 120 with which to code the input audio content. As previously noted, the keys 120 can be color coded. This allows the user to associate a key color with audio content, such as a particular word, phrase, sound, or message, such as an audio diary entry, to be recorded and stored by the box 104. As further previously noted, the keys 120 can be stored by the key storage structure 132 on the lid underside. As an example embodiment, the user can further associate the recorded audio content with an object to be stored within the toy box 104 by adhering a sticker 190 that corresponds with the key 120 (e.g., the sticker 190 has the same printed indicia as the key feature 121 of the key and/or both sticker 190 and key 120 have the same color) to the object. For example, an object such as an award (e.g., a medal) can be associated with a message input as audio content (e.g., an audio message such as "I am so happy to have won this medal") by adhering a blue sticker 190 to the object while recording the audio content using a blue key 120 to code the input audio content. This allows the user to refresh his or her memory associated with the object at a later time by selecting the key 120 that corresponds with the sticker 190 adhered to the object.

A key 120 can be removed from the storage structure 132 and inserted, key structure 122 first, into the keyhole 162 at the top end portion of the housing 140. In an example embodiment, insertion of the key in a suitable alignment with the keyhole 162 achieves suitable alignment and engagement of the key structure 122 with the switches 170 of the code reader 14. In another example embodiment, the key 120 is fit in a suitable alignment with the keyhole 162 and then rotated (e.g., in a counter-clockwise direction with respect to the upper edge surface of the housing 140) to align and engage the key structure 122 with the switches 170. The microphone 156 is activated in response to engagement of the key structure 122 with a corresponding pattern of switches 170 and also the resultant recognition by the processor 6 of the coded signal provided by the code reader 14. The processor 6 can compare stored input code signal information 10 with the code signal of the key 120 so as to identify the specific key 120 being used. In the event the code signal of the key 120, as read by the code reader 14, is not matched with any input code signal information 10 stored within memory 8, the key 120 may not be an identified key for use with the box 104. The processor 6 can then provide an audio command indicating an incorrect or unverifiable key is being used, with a further request that the user should select another (authorized) key.

In response to a correct engagement of the key structure 122 with the switches 170, a specific set of switches are closed, providing a specific code signal for processing by the processor 6 that is associated with the specific key 120 being used. The microphone 156 is then activated for a select time period, allowing the user to input audio content to be captured by the microphone 156 and converted to an input signal. The light indicator 154 can be activated (e.g., with a red LED light indication) during periods in which the microphone 156 is activated so as to provide an indication to the user that the recording period is still in effect. The processor converts the audio content to a suitable recorded audio input signal that corresponds with the coded signal of the key, where the recorded audio input signal is stored as output signal information 12 within the memory 8 and is associated with the specific coded signal for the key 120 being used to record the audio content. Alternatively, as noted above, the coded signal for the key 120 can represent an address or address pointer to a location within the memory 8 at which the output signal information 12 associated with the input audio content is stored (thus obviating the need to store input signal information for keys). When the key 120 is removed from the keyhole 162, each switch 170 that was moved to a closed position resiliently moves (e.g., due to a spring bias) back to its original open position, and the processor 6 can detect such removal of the key 120 based upon the electrical signal provided by the code reader 14 (which represents all switches 170 being in their open positions).

Any suitable number of words or phrases can be recorded over a time period as audio content and stored within the memory 8 of the box 104, where each key 120 is used to record a single portion of audio content that is then associated with that specific key 120. While the drawings depict the use of four to six keys 120 (where four keys 120 are shown, and the key storage structure 132 is configured to hold six keys 12), it is noted that the box 104 can be configured to store any selected number of audio segments (e.g., more than six) that are associated with corresponding keys 120 designed for use with the box. In addition, in other embodiments, the box can also be configured to store any suitable number of segments of different types of content (e.g., audio, video and/or textual content) input by a user and where the input segments are coded or correspond with specific keys or other accessories.

An example embodiment of retrieving recorded and coded audio content from the memory 8 of the storage box 104 can be implemented by a user first pressing the memory button 166 a suitable number of times (e.g., 2 times) to toggle the functional mode of the box 104 to a playback of recorded content setting. Next, the user selects the specific key 120 to be used, where the specific key will retrieve the corresponding audio content that is coded for the specific key. For example, the user may wish to hear a particular recorded memory that is associated with a specific key (e.g., the user may associate one or more key colors with different memories recorded in association with such keys) or with an object stored within the box 104 (where a sticker 190 adhered to the object corresponds with a key 120 that provides access to the stored audio content associated with the object) The selected key 120 is inserted, key structure 122 first, into the keyhole 162 at the top end portion of the housing 140 so as to align and engage with the switches 170 of the code reader 14. Upon detecting the coded signal provided by the code reader 14 (where the specific coded signal is based upon the pattern of closed switches 170), the processor 6 identifies the key 120 by matching the coded signal with input code signal information 10 within memory 8 (or locating a precise storage location of output signal information that is represented by the coded signal). The processor 6 further facilitates retrieval of the correct audio output signal from the output signal information 12 stored within memory and, where the correct audio output signal is associated with the input code signal information 10 that matches the coded signal provided by the code reader 14 (or is stored in a memory location that corresponds with an address or address pointer represented by the coded signal provided by the code reader 14). The correct audio output signal is then provided, via the processor 6, to the speaker 158 for conversion to audio output of the recorded message associated with the selected key 120. The user can also play other recorded audio content by selecting different keys 120 and engaging the different keys 120 within the keyhole 162 while the box 104 is within the playback of recorded content setting.

The storage box 104 also facilitates recording of different audio content for a key 120 after the key has been already used for association with previous recorded content. The user can simply proceed with the same operational steps for recording audio content for a particular key such that the key is now associated with the new recorded content. The sticker 190 that corresponds with the key 120 that codes new content can be removed from the previous object and placed on the new object associated with the new content, or a new sticker 190 that also corresponds with the key 120 can be adhered to the new object. Previously recorded content that is old (i.e., new content has now been assigned to the same key) can be optionally be marked or flagged by the processor 6 for deletion from memory 8 (e.g., to ensure memory capacity for current content associated with keys is maintained).

In a modification to the toy box 104 previously described and depicted in FIGS. 2-9, the box 104 can further include a camera as an input device 16. The camera can be located on the front surface or any other suitable surface of the housing 140 and is configured to capture still images or video images. In this embodiment, the box 104 also includes a video display as an output device 18, where the camera records images or video content for storage and the video display outputs images or video content stored by the memory 8 in a manner similar to how audio content is captured, coded and stored within the memory 8. For example, a key 120 can be used to code a still or video image captured by the camera, where the video content can be associated with an object using a sticker 190 applied to the object that corresponds with the key 120.

In a further modification to the toy box 104, coding of audio and/or video content associated with an object to be stored within the box 104 can be achieved utilizing a sticker 190 or some other suitable form of identifiable indicia that can be captured as an image by the camera of the box 104. In particular, the toy box 104 can be configured with an input button 16, such as the memory button 166, that designates input of an image of the indicia on the sticker 190 that is captured by the camera. The input image of the indicia serves as input code signal information 10 to be associated with an audio and/or video input to be stored as output signal information 12 within the memory 8. Thus, the input image stored within memory 8 can be used instead of a key 120 to retrieve recorded and stored content associated with the image.

Retrieval of the stored audio and/or video content associated with an object can be achieved by capturing the image of the printed indicia on the sticker 190 associated with the object and comparing this captured image with input code signal information 10 stored in memory 8 to find a match. Image recognition software can be provided within the memory 8 and utilized by the processor 6 during the retrieval process to compare a captured image with images stored as input code signal information 10. Upon finding a match between the captured image and an image stored as input code signal information 10, output signal information 12 that corresponds with the stored image of the input code signal information 10 is converted for output by the microphone and/or display, where the output content corresponds with the object or memory associated with the input image. This allows a user to capture audio and/or video content associated with an object (e.g., a medal or other award) and store the content within the memory 8 of the box 104 for later retrieval by capturing an image of the printed indicia on a sticker 190 and using this captured image to code the stored content. The capturing and storing of content can be coded with any suitable image that can be captured and recognized by the image recognition software. Thus, the coding of stored content can also be performed utilizing images in addition to the printed indicia on stickers 190.

Thus, the storage box 104 facilitates capturing and recording of audio and/or content (as well as other types of content, such as text content) to be associated or matched with keys, with recorded images and/or other types of accessories, where the keys, recorded images or other accessories can be used to recall the specific content that was recorded with at a later time. The use of markers (e.g., stickers) applied or linked with objects and that correspond with the coding accessories facilitates the association of a specific object with recorded and stored content, thus allowing for easy access to a recorded memory that a user associates with an object.

While the example embodiment of a storage box (as shown in FIGS. 2-8) has been described, it is noted that the present invention is not limited to this specific configuration but instead can be implemented by any suitable electronic device with corresponding accessories as described in the embodiment of FIG. 1.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

Therefore, although the disclosed inventions are illustrated and described herein as embodied in one or more specific examples, it is nevertheless not intended to be limited to the details shown, since various modifications and structural changes may be made therein without departing from the scope of the inventions. Further, various features from one of the embodiments may be incorporated into another of the embodiments. Accordingly, it is appropriate that the invention be construed broadly and in a manner consistent with the scope of the disclosure.

What is claimed:

1. An electronic system comprising:
an accessory including an accessory code; and
an electronic housing including:
a code reader operable to:
interface with the accessory; and
generate an accessory code signal that corresponds with the accessory code;
an input actuation switch;
an input device operable, upon actuation of the input actuation switch by the user, to receive user-generated content directly from a user and convert the user-generated content into a corresponding user-generated content input signal;
a memory device operable to store user-generated content input signals from the input device and operable to send the stored user-generated content input signal to an output device;
an output device operable to convert the stored user-generated content input signal received from the memory device into corresponding content for output by the output device; and
a controller operably connected to each of the code reader, the input device, the output device, and the memory device, the controller being operable to:
associate a first accessory code signal received from the code reader with a first user-generated content input signal received by the input device and stored within the memory; and
subsequent to storing of the first user-generated content input signal within the memory device, activate the output device to receive the stored first user-generated content input signal from the memory device and output content corresponding with the first user-generated content input signal in response to an input accessory code from the code reader corresponding to the first accessory signal.

2. The electronic system of claim 1, wherein content received from the input device comprises at least one of user-generated audio content, user-generated video content, and user-generated textual content.

3. The electronic system of claim 1, wherein the input device comprises a microphone and the output device comprises an audio speaker.

4. The electronic system of claim 1, wherein the input device comprises a camera and the output device comprises an image display.

5. The electronic system of claim 1, wherein the accessory comprises a key, and the housing further comprises a keyhole configured to receive at least a portion of the key, wherein the code reader interfaces with the key in response to the key being inserted within the keyhole.

6. The electronic system of claim 5, wherein the code reader comprises a plurality of electrical switches configured to engage with protrusions of the key when the portion of the key is inserted within the keyhole so as to output the accessory code signal from an electrical circuit that corresponds with the accessory code of the key.

7. The electronic system of claim 1, further comprising a marker associated with the first accessory, wherein the marker is linked with an object that is storable within the housing so as to associate the object with the first accessory and user-generated content stored within the memory that corresponds with the first accessory.

8. The electronic system of claim 1, wherein the electronic housing further includes:

a lid that is selectively movable from an open position that permits access to an internal compartment of the electronic housing to a closed position that prevents access to the internal compartment; and a locking mechanism that controls movement of the lid from the closed position to the open position;

wherein the controller is further operable to control the locking mechanism to permit movement of the lid from the closed position to the open position in response to input of a unique password via the input device.

9. The electronic system of claim 8, wherein the electronic housing further comprises a secret compartment that is non-contiguous with the internal compartment.

10. A method of associating user-generated recorded content with accessories in an electronic system, the method comprising:

providing a first accessory including a first accessory code;

providing an electronic housing including a code reader, a memory device, an input actuation switch, an input device for receiving user-generated input directly from a user, upon actuation of the input actuation switch by the user, an output device and a controller that controls operations of the code reader, memory device, input and output devices;

in response to an interface between the first accessory and the code reader, generating a first accessory code signal, via the code reader, that corresponds with the first accessory code;

facilitating, via the controller and the input device, upon actuation of the input actuation switch by the user, input of user-generated content directly from the user at the input device;

converting, via the input device, the user-generated content input by the user into a first input signal that is associated, by the controller, with the first accessory code signal; and storing, via the controller, the associated first input signal within the memory device.

11. The method of claim 10, further comprising:

in response to an interface between an accessory and the code reader, generating an accessory code signal, via the code reader, that corresponds with an accessory code of the accessory;

determining, via the controller, whether the accessory code signal generated by the code reader corresponds with the first accessory signal;

in response to a determination by the controller that the accessory code signal corresponds with the first accessory signal, providing the associated first input signal from the memory device to the output device; and converting the associated first input signal into the user-generated content and outputting the user-generated content via the output device.

12. The method of claim 11, wherein:

facilitating input of user-generated content directly by the user further comprises providing a microphone to facilitate input of user-generated audio content upon actuation of the input actuation switch by the user; and outputting of user-generated content via the output device comprises providing an audio speaker to output audio content.

13. The method of claim 11, wherein:

facilitating input of user-generated content by the user further comprises providing a camera to facilitate input of user-generated video content upon actuation of the input actuation switch by the user; and outputting of user-generated content via the output device comprises providing an image display to output user-generated video content.

14. The method of claim 10, further comprising:

providing a marker to be linked with an object storable within the housing, wherein the marker associates the object with the first accessory and content stored within the memory device that corresponds with the first accessory.

15. The method of claim 10, wherein facilitating user-generated input of content by the user further comprises:

facilitating, upon actuation of the input actuation switch by the user and via the controller, input of at least one of user-generated audio content, user-generated video content, and user-generated textual content at the input device.

16. The method of claim 10, wherein the first accessory comprises a key, the housing further comprises a keyhole, and the method further comprises:

facilitating receipt of at least a portion of the key within the key hole to achieve the interface between the first accessory and the code reader.

17. The method of claim 16, wherein the code reader comprises a plurality of electrical switches and a corresponding electrical circuit, and the method further comprises:

facilitating the interface between the first accessory and the code reader in response to the key being inserted within the keyhole such that one or more of the electrical switches engage with one or more protrusions of the key when the portion of the key is inserted within the keyhole; and in response to engagement of the one or more electrical switches with the one or more protrusions of the key, generating the accessory code signal from the electrical circuit that corresponds with the accessory code of the key.

18. The method of claim 10, wherein the electronic housing includes a lid that is selectively movable from an open position that permits access to an internal compartment of the electronic housing to a closed position that prevents access to the internal compartment, and the method further comprises:

operating, via the controller, a locking mechanism that controls movement of the lid from the closed position to the open position in response to input of a unique password via the input device.

19. The method of claim 18, further comprising:

facilitating access to a secret compartment of the electronic housing that is non-contiguous with the internal compartment.

* * * * *